United States Patent
Bang

(10) Patent No.: US 9,446,764 B2
(45) Date of Patent: Sep. 20, 2016

(54) SYSTEM AND METHOD FOR CONTROLLING ENGINE CLUTCH OF HYBRID VEHICLE

(71) Applicant: Hyundai Motor Company, Seoul (KR)

(72) Inventor: Jae Sung Bang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/687,550

(22) Filed: Apr. 15, 2015

(65) Prior Publication Data
US 2016/0031437 A1 Feb. 4, 2016

(30) Foreign Application Priority Data
Jul. 29, 2014 (KR) ........................ 10-2014-0096245

(51) Int. Cl.
*B60W 20/00* (2016.01)
*B60K 6/48* (2007.10)
*B60W 10/02* (2006.01)
*B60W 10/08* (2006.01)

(52) U.S. Cl.
CPC ............... *B60W 20/40* (2013.01); *B60K 6/48* (2013.01); *B60W 10/02* (2013.01); *B60W 10/08* (2013.01); *B60W 2510/0208* (2013.01); *B60W 2710/083* (2013.01); *B60W 2720/106* (2013.01); *Y02T 10/7258* (2013.01); *Y10S 903/902* (2013.01)

(58) Field of Classification Search
CPC ............... B60W 20/40; B60W 10/02; B60W 2510/083; B60W 270/106; B60K 6/48; Y10S 903/902

USPC .................. 701/22; 180/65.265, 65.285, 381
See application file for complete search history.

(56) References Cited

U.S. PATENT DOCUMENTS

| 4,561,530 | A | * | 12/1985 | Parsons | B60W 10/06 192/111.12 |
| 4,796,490 | A | * | 1/1989 | Butts | F16H 61/061 477/148 |
| 4,986,401 | A | * | 1/1991 | Petzold | B60W 10/02 477/176 |
| 6,026,921 | A | * | 2/2000 | Aoyama | B60K 6/48 123/348 |

(Continued)

FOREIGN PATENT DOCUMENTS

| JP | 2006-034076 A | 2/2006 |
| KR | 2014-0048003 A | 4/2014 |
| KR | 10-1393562 B1 | 5/2014 |

*Primary Examiner* — McDieunel Marc
(74) *Attorney, Agent, or Firm* — Mintz Levin Cohn Ferris Glovsky and Popeo, P.C.; Peter F. Corless

(57) ABSTRACT

A system and a method for controlling an engine clutch of a hybrid vehicle are provided which maintain the acceleration of the vehicle substantially constant before and after release of an engine clutch to prevent a driver from feeling a sense of difference due to a change in inertia when the engine clutch is released. When an engine clutch is released to transfer the driving mode of the vehicle from a hybrid electric vehicle (HEV) mode to an electric vehicle (EV) mode, the acceleration of the vehicle before and after release of an engine clutch is maintained substantially constant by adjusting motor torque to be decreased and gently adjusting the motor torque to be suitable for a driver request torque in the EV mode.

11 Claims, 3 Drawing Sheets

(56) References Cited

U.S. PATENT DOCUMENTS

| | | | | |
|---|---|---|---|---|
| 7,472,769 B2* | 1/2009 | Yamanaka | B60W 30/186 | 180/65.25 |
| 7,766,107 B2* | 8/2010 | Joe | B60K 6/48 | 180/65.21 |
| 7,784,575 B2* | 8/2010 | Yamanaka | B60K 6/48 | 180/65.265 |
| 8,831,818 B2* | 9/2014 | Park | G06F 17/00 | 701/22 |
| 2013/0110333 A1* | 5/2013 | Song | B60K 6/387 | 701/22 |
| 2015/0105215 A1* | 4/2015 | Park | B60K 6/442 | 477/5 |
| 2015/0134173 A1* | 5/2015 | Choi | B60W 20/00 | 701/22 |
| 2015/0344025 A1* | 12/2015 | Park | B60K 6/48 | 701/22 |

\* cited by examiner

SYSTEM AND METHOD FOR CONTROLLING ENGINE CLUTCH OF HYBRID VEHICLE

CROSS-REFERENCE TO RELATED APPLICATION

This application claims under 35 U.S.C. §119(a) the benefit of Korean Patent Application No. 10-2014-0096245 filed on Jul. 29, 2014, the entire contents of which are incorporated herein by reference.

BACKGROUND (a) Technical Field

The present disclosure relates to a system and a method for controlling an engine clutch of a hybrid vehicle. More particularly, the present disclosure relates to a system and a method for controlling an engine clutch of a hybrid vehicle, which constantly maintains the acceleration of the vehicle before and after release of an engine clutch to prevent a driver from feeling a sense of difference due to a change in inertia when the engine clutch is released.

(b) Background Art

Among green vehicles (e.g., environmentally friendly vehicles), a hybrid vehicle is a vehicle that uses an engine together with a motor as a power source, to promote the reduction in emission of exhaust gas and the improvement of fuel efficiency. A power transmission system for separately transmitting power of the engine or motor to drive wheels or simultaneously transmitting power of the engine and motor to the drive wheels is mounted within the hybrid vehicle.

A power transmission system for a hybrid vehicle, i.e., a powertrain, as shown in FIG. 1, includes an engine 10 and a motor 12, arranged in series, an engine clutch 13 disposed between the engine 10 and the motor 12 and configured to transmit or interrupt power of the engine, an automatic transmission 14 configured to vary a speed of power of the motor or the motor and engine and output the power to drive wheels, a hybrid starter generator (HSG) 16 connected to a crank pulley of the engine to perform engine starting and power generation, and the like. The power transmission system is divided into an engine clutch front part 100 and an engine clutch rear part 200 based on the engine clutch 13.

The power transmission system for the hybrid vehicle is of a type in which the motor is mounted to a side of the automatic transmission. The power transmission system is called as a Transmission Mounted Electric Device (TMED). The power transmission system provides driving modes including an electric vehicle (EV) mode that is a pure electric vehicle mode using power of the motor, a hybrid electric vehicle (HEV) mode in which the motor is used as an auxiliary power source while using the engine as a main power source, a regenerative braking (RB) mode in which braking energy or inertia energy of the vehicle produced by braking or during driving by inertia is recovered through power generation of the motor and is charged in a battery, and the like.

The HEV mode refers to a mode in which when driving such as starting, acceleration or hill climbing (e.g., driving on an incline) is required in which a substantial load is applied to the engine, a main relay is on simultaneously when the engine clutch is engaged, allowing the vehicle to be driven by a sum of output torques of the engine and the motor. In the EV mode in which the vehicle is driven using the motor, the main relay is on simultaneously when the engine clutch is disengaged, allowing the vehicle to be driven by the output torque of the motor.

When the driving mode is transferred from the EV mode to the HEV mode, the engine clutch is engaged. For example, after the speeds of both ends of the engine clutch, (i.e., the output speeds of the engine and the motor are synchronized together with cranking by an integrated starter generator (ISG)) the engine clutch is engaged, to perform the transfer of the driving mode to the HEV. In the HEV mode, as shown by a dotted line box in FIG. 1, the engine clutch front part 100 including the engine 10 and the engine clutch rear part 200 including the motor 12 operate as one rigid body. In the EV mode, the engine clutch front part 100 and the engine clutch rear part 200 operate as independent rigid bodies.

Therefore, in the transfer of the driving mode between the HEV mode and the EV mode, one rigid body is suddenly changed into two rigid bodies, or two rigid bodies are suddenly changed into one rigid body. Hence, a change occurs in inertia or the like, and vibration, shake or the like, caused by the change in inertia, is delivered to a driver causing the driver to feel a sense of difference, that is, to feel the vibration, jerk, shock, or the like. In other words, as the engine clutch front part and the engine clutch rear part, constituting one rigid body, operate as independent rigid bodies when the engine clutch is released, a change in inertia occurs. Therefore, the driver feels a sense of difference due to a change in acceleration of the engine clutch rear part, caused by the change in inertia.

The above information disclosed in this section is merely for enhancement of understanding of the background of the invention and therefore it may contain information that does not form the prior art that is already known in this country to a person of ordinary skill in the art.

SUMMARY

The present invention provides a system and a method for controlling an engine clutch of a hybrid vehicle, in which when an engine clutch is released to transfer the driving mode of the vehicle from a hybrid electric vehicle (HEV) mode to an electric vehicle (EV) mode, the acceleration of the vehicle before and after release of an engine clutch may be maintained substantially constant by adjusting motor torque to be decreased and gently adjusting the motor torque to be suitable for a driver request torque in the EV mode, to prevent the driver from feeling a sense of difference due to a change in acceleration of an engine clutch rear part, caused by a change in inertia.

In one aspect, the present invention provides a system for controlling an engine clutch of a hybrid vehicle that may include: a sensor configured to sense whether the engine clutch is released in a transfer from an HEV mode to an EV mode; a first motor torque controller configured to adjust a motor torque in a transfer section to be decreased to a level where the acceleration of the vehicle before and after the release of the engine clutch is maintained substantially constant, in response to determining that the engine clutch has been released; and a second motor torque controller configured to adjust the motor torque in the transfer section to the level of a driver request torque in the EV mode.

In an exemplary embodiment, the first motor torque controller may be configured to calculate the motor torque in the transfer section at a level where a change in acceleration of an engine clutch rear part is prevented from an equation considering inertia before and after the release of the engine:

$$\omega_m^{EV} = \omega_m^{HEV} : \frac{T_{Motor}^{EV}}{J_2} = \frac{T_{HSG}^{HEV} + T_{Engine}^{HEV} + T_{Motor}^{HEV}}{J_1 + J_2}$$

$$\Rightarrow T_{Motor}^{EV} = \frac{J_2}{J_1 + J_2}(T_{HSG}^{HEV} + T_{Engine}^{HEV} + T_{Motor}^{HEV}).$$

In addition, the second motor torque controller may include a blended motor torque commander configured to calculate a blended motor torque obtained by blending the driver request torque and the motor torque in the transfer section, adjusted to be decreased by the first motor torque controller, and gradually increase or decrease the motor torque in the transfer section to the level of the driver request torque while commanding the calculated blended motor torque to a motor; and a motor torque calculator configured to calculate that the blended motor torque substantially similar to the driver request torque to stop commanding the blended motor torque to the motor.

In another aspect, the present invention provides a method for controlling an engine clutch for a hybrid vehicle that may include: determining whether the engine clutch is released in transfer from a HEV mode to an EV mode; adjusting a motor torque in a transfer section to a level where the acceleration of the vehicle before and after the release of the engine clutch is maintained substantially constant, in response to determining that the engine clutch has been released; and adjusting the motor torque in the transfer section to the level of a driver request torque in the EV mode.

In an exemplary embodiment, the motor torque in the transfer section may be adjusted to be decreased to a level where a change in acceleration of an engine clutch rear part is prevented. In addition, the motor torque in the transfer section may be calculated using an equation considering inertia before and after the release of the engine:

$$\omega_m^{EV} = \omega_m^{HEV} : \frac{T_{Motor}^{EV}}{J_2} = \frac{T_{HSG}^{HEV} + T_{Engine}^{HEV} + T_{Motor}^{HEV}}{J_1 + J_2}$$

$$\Rightarrow T_{Motor}^{EV} = \frac{J_2}{J_1 + J_2}(T_{HSG}^{HEV} + T_{Engine}^{HEV} + T_{Motor}^{HEV}).$$

Further, the second motor torque adjustment process may include calculating a blended motor torque obtained by blending the driver request torque and the motor torque in the transfer section, adjusted to be decreased in the first motor torque adjustment process, and gradually increase or decrease the motor torque in the transfer section to the level of the driver request torque while commanding the calculated blended motor torque to a motor; and stopping commanding the blended motor torque to the motor, when the blended motor torque is substantially similar to the driver request torque. The driver request torque and the motor torque in the transfer section, adjusted to be decreased in the first motor torque adjustment process may be blended using a weighting factor.

The present invention provides advantages as follows.

When the engine clutch is released to transfer the driving mode of the hybrid vehicle from the HEV mode to the EV mode during driving of the hybrid vehicle, the acceleration of the vehicle before and after release of the engine clutch may be maintained substantially constant by adjusting the motor torque to be decreased and gently adjusting the motor torque to be suitable for a driver request torque in the EV mode. Accordingly, it may be possible to prevent the driver from feeling a sense of difference due to a change in acceleration of the engine clutch rear part, caused by a change in inertia, when the engine clutch is released. As a result, it may be possible to improve the driving feeling of the hybrid vehicle.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
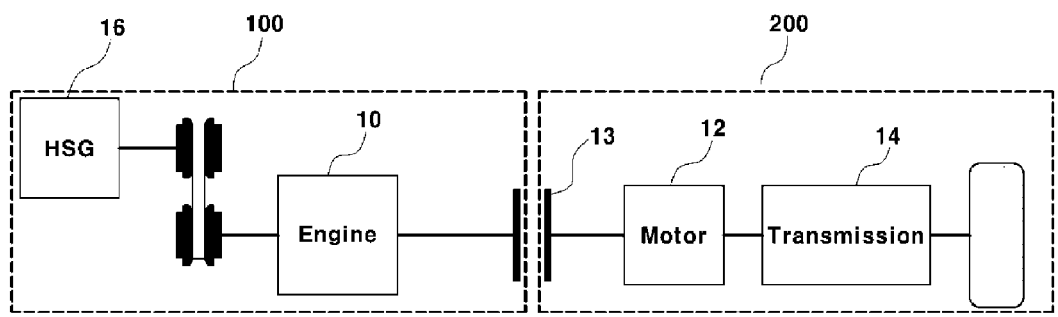
FIG. 1 is an exemplary schematic diagram illustrating the configuration of a powertrain of a hybrid vehicle according to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention may be configured to eliminate a driver sense of difference due to a change in transmission torque, caused by a change in inertia (e.g., a change in inertia of a hybrid starter generator (HSG) rotating body, an engine rotating body, an engine clutch input rotating body, or the like) when the driving mode of the hybrid vehicle is transferred to an electric vehicle (EV) mode from a hybrid electric vehicle (HEV) mode in which an engine clutch is engaged, that is, when the engine clutch is released. An object of the present invention is to control the acceleration of the vehicle to be substantially constant before and after release of the engine clutch by sensing whether the engine clutch is released or slipped, calculating a variation of transmission torque in the release of the engine clutch, and by adjusting motor torque by the variation of transmission torque.

Figure 2:
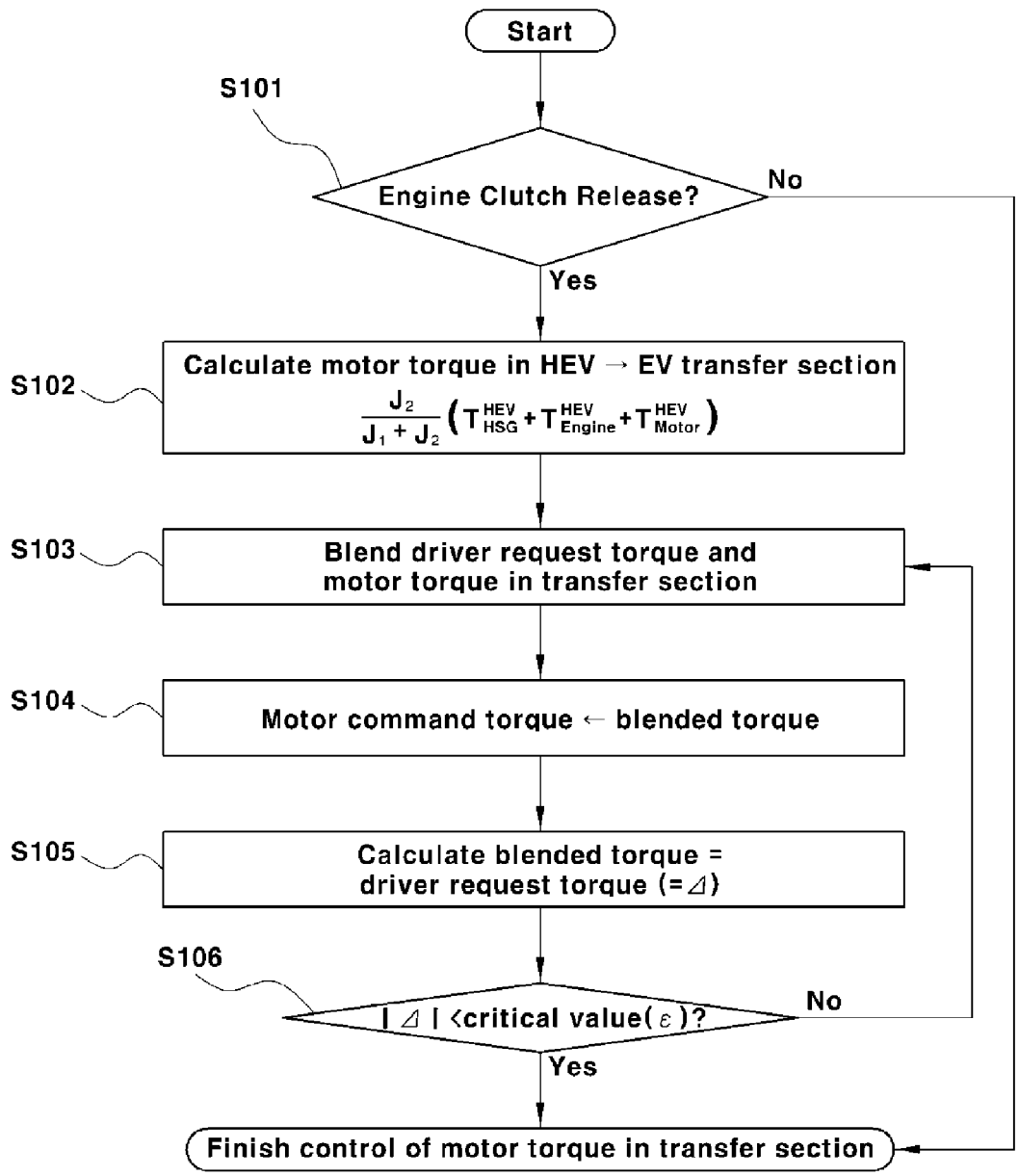
FIG. 2 is an exemplary flowchart illustrating a method for controlling an engine clutch of a hybrid vehicle according to an exemplary embodiment of the present invention.

FIG. 2 is an exemplary flowchart illustrating a method for controlling an engine clutch of a hybrid vehicle according to an exemplary embodiment of the present invention. First, when the driving mode of the vehicle is transferred from an HEV mode to an EV mode, a controller may be configured to determine or sense whether the engine clutch is released S101. Subsequently, in response to determining that the engine clutch has been released, a first motor torque controller may be configured to adjust motor torque to be decreased to a level where the acceleration of the vehicle before and after the release of the engine clutch is maintained to be substantially constant.

In other words, as the engine clutch is released, the driving mode of the hybrid vehicle may be transferred from the HEV mode to the EV mode, and the motor torque, which may be adjusted to be decreased to the level when the acceleration of the vehicle before and after the release of the engine clutch is maintained substantially constant, may be calculated using a governing equation before and after the mode transfer S102. In the transfer from the HEV mode to the EV mode, the governing equation before and after the mode transfer is expressed as shown in the following Equations 1 and 2.

$$\text{HEV mode: } (J_1 + J_2)\dot{\omega}_m^{HEV} = T_{HSG}^{HEV} + T_{Engine}^{HEV} + T_{Motor}^{HEV} \quad \text{Equation 1}$$

$$\dot{\omega}_m^{HEV} = \frac{T_{HSG}^{HEV} + T_{Engine}^{HEV} + T_{Motor}^{HEV}}{J_1 + J_2}$$

$$\text{EV mode: } J_2 \dot{\omega}_m^{EV} = T_{Motor}^{EV} \quad \text{Equation 2}$$

$$\dot{\omega}_m^{EV} = \frac{T_{Motor}^{EV}}{J_2}$$

Equation 1 is an expression for obtaining a motor acceleration in the HEV mode. The motor acceleration in the HEV mode is expressed as a value obtained by dividing the sum ($T_{HSG}^{HEV} + T_{Engine}^{HEV} + T_{Motor}^{HEV}$) of HSG torque, engine torque and motor torque by the sum of inertia ($J_1$) of an engine clutch front part and inertial ($J_2$) of an engine clutch rear part.

Equation 2 is an expression for obtaining a motor acceleration in the EV mode. The motor acceleration ($\dot{\omega}_m^{EV}$) is expressed as a value $$\left(\frac{T_{Motor}^{EV}}{J_2}\right)$$

obtained by dividing motor torque ($T_{Motor}^{EV}$) in the EV mode by the inertia ($J_2$) of the engine clutch rear part.

In this state, to eliminate a sense of difference with respect to a change in acceleration when the driving mode of the vehicle is transferred from the HEV mode to the EV mode, a change (e.g., an adjustment) in motor torque in the EV mode may be performed to maintain the motor accelerations in the HEV mode and the EV mode at about the same level. Accordingly, the motor torque when the driving mode of the vehicle is transferred from the HEV mode to the EV mode, i.e., the motor torque in the transfer section may be calculated using the following Equation 3 obtained based on Equations 1 and 2.

$$\dot{\omega}_m^{EV} = \dot{\omega}_m^{HEV} : \frac{T_{Motor}^{EV}}{J_2} = \frac{T_{HSG}^{HEV} + T_{Engine}^{HEV} + T_{Motor}^{HEV}}{J_1 + J_2} \quad \text{Equation 3}$$

$$\Rightarrow T_{Motor}^{EV} = \frac{J_2}{J_1 + J_2}(T_{HSG}^{HEV} + T_{Engine}^{HEV} + T_{Motor}^{HEV})$$

In Equations 1 to 3, definitions of individual variables and parameters are as follows.

$J_1$: Inertia of the engine clutch front part
$J_2$: Inertia of the engine clutch rear part
$\dot{\omega}_m^{HEV}$: Motor acceleration in the HEV mode
$\dot{\omega}_m^{EV}$: Motor acceleration in the EV mode
$T_{HSG}^{HEV}$: HSG torque in the HEV mode
$T_{Engine}^{HEV}$: Engine torque in the HEV mode
$T_{Motor}^{HEV}$: Motor torque in the HEV mode
$T_{Motor}^{EV}$: Motor torque in the EV mode Thus, when the driving mode of the vehicle is transferred from the HEV mode to the EV mode, the motor torque ($T_{Motor}^{EV}$) in the transfer section, i.e., $$\frac{J_2}{J_1+J_2}(T_{HSG}^{HEV} + T_{Engine}^{HEV} + T_{Motor}^{HEV})$$

may be calculated using Equation 3, and the calculated motor torque in the transfer section shows a value decreased compared to that in the HEV mode before the engine clutch is released.

More specifically, the motor torque ($T_{Motor}^{EV}$) in the transfer section may be adjusted to be decreased to a level where the first motor torque controller maintains the acceleration of the vehicle substantially constant before and after the release of the engine clutch, i.e., a level where the change in acceleration of the engine clutch rear part is prevented.

In particular, the motor torque ($T_{Motor}^{EV}$) in the transfer section may be adjusted to be decreased since, as shown in Equation 3, the value $$\left(\frac{J_2}{J_1+J_2}\right)$$

obtained by dividing the inertia ($J_2$) of the engine clutch rear part by the sum of the inertia ($J_1$) of the engine clutch front part and the inertia ($J_2$) of the engine clutch rear part is multiplied by the HSG torque, the engine torque, and the motor torque.

Figure 3:
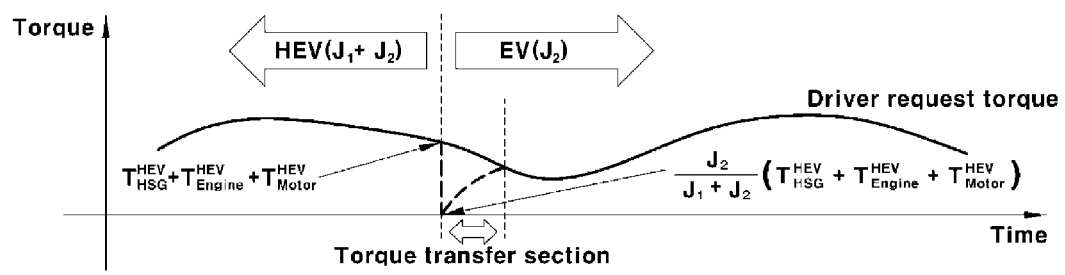
FIG. 3 is an exemplary torque line diagram illustrating motor torque adjusted in a transfer period from a hybrid electric vehicle (HEV) mode to an electric vehicle (EV) mode in the method according to the exemplary embodiment of the present invention.

Thus, as shown in FIG. 3, the inertia at the moment when the driving mode of the vehicle is transferred from the HEV mode to the EV mode may also be changed from ($J_1+J_2$) to $J_2$. Accordingly, the change in acceleration before and after the release of the engine clutch of the vehicle may be prevented, based on adjustment of the operating torque in the HEV mode, i.e., the sum ($T_{HSG}^{HEV}+T_{Engine}^{HEV}+T_{Motor}^{HEV}$) of the HSG torque, the engine torque and the motor torque to be decreased to the motor torque $$\left(\frac{J_2}{J_1+J_2}(T_{HSG}^{HEV} + T_{Engine}^{HEV} + T_{Motor}^{HEV})\right)$$

in the transfer section when the driving mode of the vehicle is transferred to the EV mode as the engine clutch is released.

Furthermore, a driver request torque in the EV mode and the motor torque ($T_{Motor}^{EV}$) in the transfer section may be blended (S103) to slowly adjust the motor torque in the transfer section to the level of the driver request torque. In other words, a second motor torque controller may be configured to adjust the motor torque in the transfer section, calculated as described above, to be adjusted to the level of the driver request torque. Accordingly, the second motor torque controller may be configured to blend (e.g., combine) the driver request torque and the motor torque adjusted to be decreased by the first motor torque controller.

The driver request torque and the motor torque adjusted to be decreased by the first motor torque controller may be blended using a weighting factor. In particular, the weighting factor may be implemented using a look-up table, a low pass filter, or the like. After the driver request torque and the motor torque adjusted to be decreased by the first motor torque controller are blended using the weighting factor, a blended motor torque for gradually increasing or decreasing the motor torque in the transfer section to the level of the driver request torque may be commanded (e.g., requested) to the motor S104.

Figure 4:
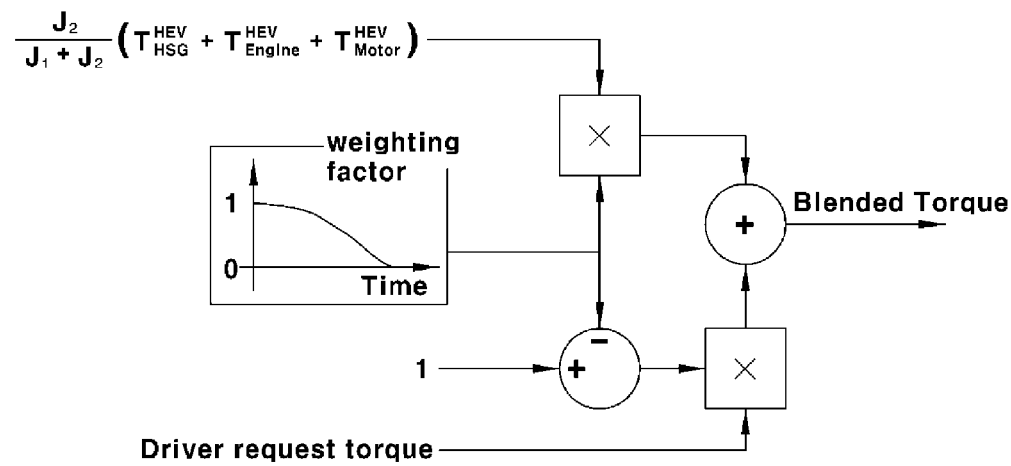
FIG. 4 is an exemplary control diagram illustrating a method for blending motor torque decreased in the transfer period from the HEV mode to the EV mode with driver request torque in the method according to the exemplary embodiment of the present invention.

For example, referring to FIG. 4, starting from a value obtained by initially multiplying the motor torque ($T_{Motor}^{EV}$) in the transfer section, calculated as described above, i.e., $$\frac{J_2}{J_1+J_2}(T_{HSG}^{HEV} + T_{Engine}^{HEV} + T_{Motor}^{HEV})$$

by 1 as a weighting factor, blended motor torques of values obtained by sequentially multiplying values between 0 and 1 as weighting factors according to the time of the transfer section may be sequentially commanded, so that, as shown in a dotted line having a slope of FIG. 2, the motor torque in the transfer section may be gently increased to the level of the driver request torque. In particular, when the driver request torque is changed in the transfer section to be a lower torque (e.g., a decreased torque) the motor torque in the transfer section may be gently decreased to the level of the driver request torque.

As a change of slowly increasing or decreasing the motor torque in the transfer section is provided to satisfy the driver request torque, it may be possible to prevent a sense of difference that the driver feels by the change in torque. Further, it may be possible to satisfy a driver acceleration and deceleration request. Subsequently, when the blended motor torque is substantially similar to the driver request torque, a motor torque calculator may be configured to calculate that the blended motor torque is substantially similar to the driver request torque to stop the blended motor torque commanding process S105.

For example, when a difference value (Δ) between the blended motor torque and the driver request torque is calculated, and the calculated difference value approaches a critical value (ε), the blended motor torque commanding process with respect to the motor may be stopped. In particular, the blended motor torque commanding process may be stopped since the motor torque has approached the driver request torque. Thus, the motor torque may be operated as the driver request torque. Accordingly, when the difference value (Δ) between the blended motor torque and the driver request torque approaches the critical value (ε), the adjustment of the motor torque in the transfer section, described above, may be complete.

As described above, in consideration that the inertia is changed from $J_1+J_2$ to $J_2$ at the moment when the driving mode of the hybrid vehicle is transferred from the HEV mode to the EV mode during driving of the hybrid vehicle, the motor torque in the transfer section to the EV mode may be changed to be decreased. Continuously, the motor torque in the transfer section may be slowly changed to the level of the driver request torque, maintain a change in acceleration of the vehicle to be substantially constant before and after the release of the engine clutch. Accordingly, the driver may feel a comfortable and improved driving feeling.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A system for controlling an engine clutch of a hybrid vehicle, comprising:
   a sensor configured to sense whether the engine clutch is released in a transfer from a hybrid electric vehicle (HEV) mode to an electric vehicle (EV) mode;

a first motor torque controller configured to adjust a motor torque in a transfer section to be changed to a level where the acceleration of the vehicle before and after the release of the engine clutch is maintained substantially constant, in response to determining that the engine clutch has been released; and a second motor torque controller configured to adjust the motor torque in the transfer section to the level of a driver request torque in the EV mode, wherein the first motor torque controller is configured to calculate the motor torque in the transfer section at a level where a change in acceleration of an engine clutch rear part is prevented, in consideration that inertia is changed from Inertia of the engine clutch part (J1)+Inertia of the engine clutch rear part (J2) to Inertia of the engine clutch rear part (J2).

2. The system of claim 1, wherein the first motor torque controller is configured to calculate the motor torque in the transfer section at a level where a change in acceleration of an engine clutch rear part is prevented from an equation considering inertia before and after the release of the engine:

$$\dot{\omega}_m^{EV} = \dot{\omega}_m^{HEV} : \frac{T_{Motor}^{EV}}{J_2} = \frac{T_{HSG}^{HEV} + T_{Engine}^{HEV} + T_{Motor}^{HEV}}{J_1 + J_2}$$

$$\Rightarrow T_{Motor}^{EV} = \frac{J_2}{J_1 + J_2}(T_{HSG}^{HEV} + T_{Engine}^{HEV} + T_{Motor}^{HEV}), \text{ and}$$

wherein, in the above equation,
$J_1$: Inertia of the engine clutch front part
$J_2$: Inertia of the engine clutch rear part
$\dot{\omega}_m^{HEV}$: Motor acceleration in the HEV mode
$\dot{\omega}_m^{EV}$: Motor acceleration in the EV mode
$T_{HSG}^{HEV}$: HSG torque in the HEV mode
$T_{Engine}^{HEV}$: Engine torque in the HEV mode
$T_{Motor}^{HEV}$: Motor torque in the HEV mode
$T_{Motor}^{EV}$: Motor torque in the EV mode.

3. The system of claim 1, wherein the second motor torque controller is configured to:
calculate a blended motor torque obtained by blending the driver request torque and the motor torque in the transfer section, adjusted to be decreased by the first motor torque controller, and gradually increase or decrease the motor torque in the transfer section to the level of the driver request torque while commanding the calculated blended motor torque to a motor; and
calculate that the blended motor torque is substantially similar to the driver request torque to stop commanding the blended motor torque to the motor.

4. A method for controlling an engine clutch of a hybrid vehicle, the method comprising:
identifying, by a sensor, whether the engine clutch is released in transfer from a hybrid electric vehicle (HEV) mode to an electric vehicle (EV) mode;
adjusting, by a first controller, a motor torque in a transfer section to a level where the acceleration of the vehicle before and after the release of the engine clutch is maintained substantially constant, in response to determining that the engine clutch has been released; and
adjusting, by a second controller, the motor torque in the transfer section to the level of a driver request torque in the EV mode,
wherein the motor torque is calculated by the first controller in the transfer section at a level where a change in acceleration of an engine clutch rear part is prevented, in consideration that inertia is changed from Inertia of the engine clutch part (J1)+Inertia of the engine clutch rear part (J2) to Inertia of the engine clutch rear part (J2).

5. The method of claim 4, wherein the motor torque in the transfer section is adjusted to be decreased to a level where a change in acceleration of an engine clutch rear part is prevented.

6. The method of claim 5, wherein the motor torque in the transfer section is calculated by an equation considering inertia before/after the release of the engine:

$$\dot{\omega}_m^{EV} = \dot{\omega}_m^{HEV} : \frac{T_{Motor}^{EV}}{J_2} = \frac{T_{HSG}^{HEV} + T_{Engine}^{HEV} + T_{Motor}^{HEV}}{J_1 + J_2}$$

$$\Rightarrow T_{Motor}^{EV} = \frac{J_2}{J_1 + J_2}(T_{HSG}^{HEV} + T_{Engine}^{HEV} + T_{Motor}^{HEV}), \text{ and}$$

wherein, in the above equation,
$J_1$: Inertia of the engine clutch front part
$J_2$: Inertia of the engine clutch rear part
$\dot{\omega}_m^{HEV}$: Motor acceleration in the HEV mode
$\dot{\omega}_m^{EV}$: Motor acceleration in the EV mode
$T_{HSG}^{HEV}$: HSG torque in the HEV mode
$T_{Engine}^{HEV}$: Engine torque in the HEV mode
$T_{Motor}^{HEV}$: Motor torque in the HEV mode
$T_{Motor}^{EV}$: Motor torque in the EV mode.

7. The method of claim 4, further comprising:
calculating, by the second controller, a blended motor torque obtained by blending the driver request torque and the motor torque in the transfer section, adjusted to be decreased by the first controller, and gradually increase or decrease the motor torque in the transfer section to the level of the driver request torque while commanding the calculated blended motor torque to a motor; and
commanding, by the second controller, the blended motor torque to the motor, when the blended motor torque is substantially similar to the driver request torque.

8. The method of claim 7, wherein the driver request torque and the motor torque in the transfer section, adjusted to be decreased by the first controller, are blended using a weighting factor.

9. A non-transitory computer readable medium containing program instructions executed by a controller, the computer readable medium comprising:
program instructions that control a sensor to identify whether the engine clutch is released in transfer from a hybrid electric vehicle (HEV) mode to an electric vehicle (EV) mode;
program instructions that adjust a motor torque in a transfer section to a level where the acceleration of the vehicle before and after the release of the engine clutch is maintained substantially constant, in response to determining that the engine clutch has been released; and
program instructions that adjust the motor torque in the transfer section to the level of a driver request torque in the EV mode,
wherein the motor torque is calculated in the transfer section at a level where a change in acceleration of an engine clutch rear part is prevented, in consideration that inertia is changed from Inertia of the engine clutch part (J1)+Inertia of the engine clutch rear part (J2) to Inertia of the engine clutch rear part (J2).

10. The non-transitory computer readable medium of claim 9, wherein the motor torque in the transfer section is adjusted to be decreased to a level where a change in acceleration of an engine clutch rear part is prevented.

11. The non-transitory computer readable medium of claim 9, wherein the motor torque in the transfer section is calculated by an equation considering inertia before/after the release of the engine:

$$\dot{\omega}_m^{EV} = \dot{\omega}_m^{HEV} : \frac{T_{Motor}^{EV}}{J_2} = \frac{T_{HSG}^{HEV} + T_{Engine}^{HEV} + T_{Motor}^{HEV}}{J_1 + J_2}$$

$$\Rightarrow T_{Motor}^{EV} = \frac{J_2}{J_1 + J_2}(T_{HSG}^{HEV} + T_{Engine}^{HEV} + T_{Motor}^{HEV}), \text{ and}$$

wherein, in the above equation,
$J_1$: Inertia of the engine clutch front part
$J_2$: Inertia of the engine clutch rear part
$\dot{\omega}_m^{HEV}$: Motor acceleration in the HEV mode
$\dot{\omega}_m^{EV}$: Motor acceleration in the EV mode
$T_{HSG}^{HEV}$: HSG torque in the HEV mode
$T_{Engine}^{HEV}$: Engine torque in the HEV mode
$T_{Motor}^{HEV}$: Motor torque in the HEV mode
$T_{Motor}^{EV}$: Motor torque in the EV mode.

* * * * *